United States Patent

Stanner

[15] 3,680,910
[45] Aug. 1, 1972

[54] VEHICLE BODY CLOSURE PANEL

[72] Inventor: Donald Stanner, Lathrup Village, Mich.

[73] Assignee: General Motors Corporation, Detroit, Mich.

[22] Filed: April 1, 1971

[21] Appl. No.: 130,340

[52] U.S. Cl. ..........................296/29, 29/513, 296/76
[51] Int. Cl. ............................................B62d 25/12
[58] Field of Search ......296/29, 30, 76, 146; 29/513; 49/462, 502; 52/620, 622, 623, 627

[56] References Cited

UNITED STATES PATENTS

| | | | |
|---|---|---|---|
| 1,584,393 | 5/1926 | Marshall | 296/30 |
| 1,730,464 | 10/1929 | Levine | 296/29 X |
| 1,851,055 | 3/1932 | O'Connor et al. | 52/623 |
| 2,566,871 | 9/1951 | Bedford et al. | 49/502 |
| 2,733,097 | 1/1956 | Stevens | 49/462 |

*Primary Examiner*—Benjamin Hersh
*Assistant Examiner*—Leslie J. Paperner
*Attorney*—W. E. Finken and Herbert Furman

[57] ABSTRACT

A vehicle body closure panel, such as a deck lid, includes an inner panel and an outer panel having the edge portions thereof hem flanged over the respective edge portions of the inner panel. The inner and outer panels are secured together against relative shifting movement by heat cured adhesive. Spaced edge portions of the inner panel are each provided with a plurality of angularly offset respective tabs which extend laterally of the edge portions and are spaced longitudinally thereof. One group of tabs is located at one distance from the terminus of a respective edge portion, another group is located a different distance, and still another is located a different distance. When the panels are assembled and the hem flanges of the outer panel are bent over the spaced edge portions of the inner panel, the hem flange edges are engageable with tabs of one or more of the aforenoted groups to limit relative shifting movement of the panels before the adhesive is heat cured. Those tabs located under the hem flanges are partially or wholly moved back into registry with the inner panel.

8 Claims, 3 Drawing Figures

PATENTED AUG 1 1972 3,680,910

INVENTOR.
Donald Stanner
BY
Herbert Furman
ATTORNEY

VEHICLE BODY CLOSURE PANEL

This invention relates generally to vehicle body closure panels and more particularly to vehicle body closure panels of the type including an outer panel hem flanged over an inner panel.

Vehicle body closure panels having an outer panel hem flanged over an inner panel are well known. Ordinarily, the hem flanges are spot welded to the inner panel to secure the panels to each against shifting movement. It is also known to omit the spot welding and secure the inner panel to the outer panel by heat curable adhesive. Ordinarily, the adhesive is applied in the manufacturing or stamping plant and the closure panel shipped to a body assembly plant before the adhesive is fully cured. During assembly of the body, it passes through one or more ovens which fully cure the adhesive.

During shipment and otherwise, it is possible for the inner panel and outer panel to shift relative to each other since the adhesive is not fully cured and may also provide a lubricant between the panels depending on the type of adhesive. This may cause assembly problems due to movement of various hardware mounting provisions on the inner panel out of the desired relationship with respect to the edges of the outer panel.

The closure panel of this invention obviates this problem by including abutments on the edge portions of the inner panel which are automatically engageable by the free edges of the respective hem flanges of the outer panel when the panels are assembled to limit any shifting movement of the panels relative to each other regardless of whether the adhesive is cured.

In a preferred embodiment of the invention, spaced edge portions of the inner panel are provided with a plurality of angularly offset integral respective tabs or abutments which extend laterally of the terminus of the edge portion and are spaced longitudinally of the edge portion. One group of tabs is spaced a predetermine distance from the terminus of a respective edge portion. Another group is spaced a predetermined distance which is different than that of the first group. Still other groups are spaced distances different from each other and from the first and second groups. As many groups as may be deemed necessary are provided. Upon hem flanging of the outer panel over the inner panel, the terminus or free edge of each hem flange will engage or be in closely spaced adjacent relationship to abutments of one or more groups. Certain of the abutments may be located under the hem flanges, and these are wholly or partially moved into registry with the inner panel during the hem flanging operation. By having a plurality of abutments on the spaced edge portions of the inner panel engageable with the free edge or terminus of a respective hem flange, relative shifting movement of the inner and outer panels is effectively barred regardless of whether the adhesive has been cured.

It is therefore a primary feature of this invention to provide an automatic interlock between vehicle body closure panels of the hem flanged type to prevent any movement of the panels relative to each other prior to curing of an adhesive bonding the panels to each other.

This and other features of this invention will be readily apparent from the following specification and drawings wherein.

Figure 1:
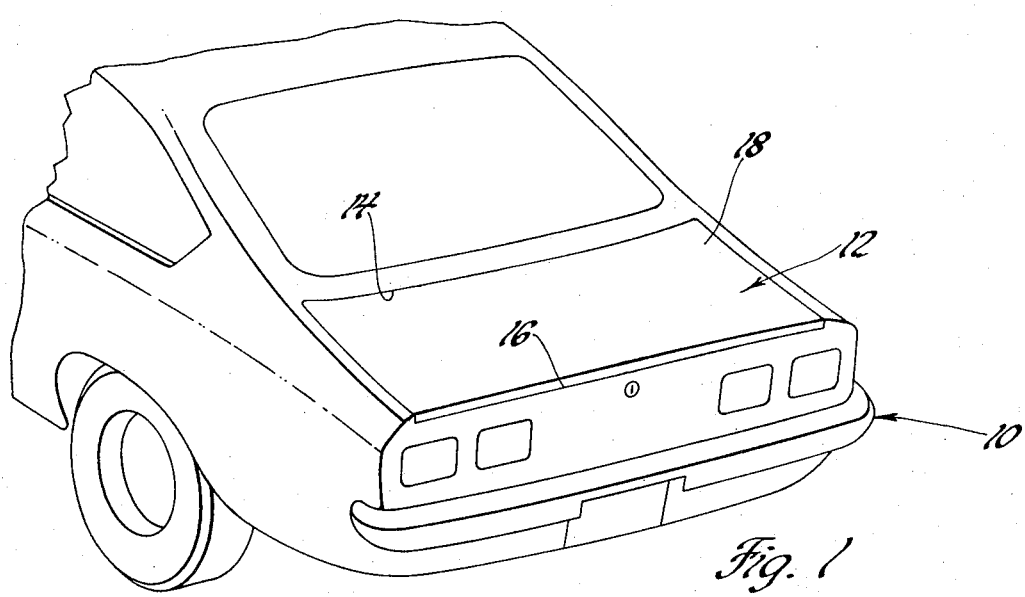
FIG. 1 is a partial perspective view of the rear portion of a vehicle body having a deck lid embodying the invention.

Referring now to the drawings, a vehicle designated generally 10 in FIG. 1 includes a closure panel or rear deck lid 12 which is conventionally hinged adjacent its forward edge 14 to the body 10 and conventionally latched thereto adjacent its rearward edge 16 for movement between a closed position as shown and an open position, not shown.

Figure 2:
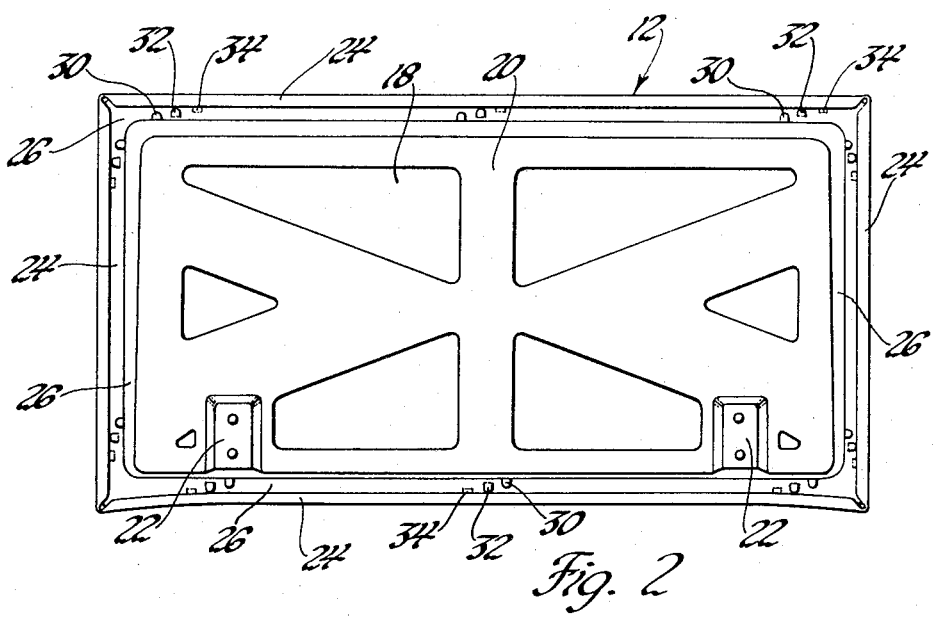
FIG. 2 is an enlarged bottom plan view of the deck lid.
Figure 3:
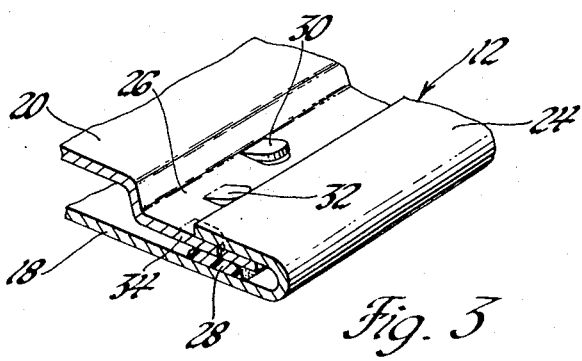
FIG. 3 is an enlarged perspective view of a portion of FIG. 2.

As shown in FIGS. 2 and 3, the deck lid 12 includes an outer panel 18 and an inner panel 20. The inner panel 20 is conventionally apertured and ribbed and provided with various embossments, such as embossments 22 which provide for mounting of the deck lid hinges to the deck lid. As is conventional, panel 18 includes edge portions or hem flanges 24 which are hem flanged over respective edge portions 26 of the inner panel during assembly of the deck lid. As shown in FIG. 3, a bead 28 of heat curable adhesive is provided between the edge portions 26 of the inner panel and the inner surface of the outer panel to secure the panels to each other upon curing of the adhesive. The bead may be continuous or discontinuous and may be applied elsewhere than as shown between the panels 18 and 20 as is known to those skilled in the art. Until the bead 28 is heat cured, it is possible for the panels 18 and 20 to shift relative to each other since the flanges 24 are not spot welded to the edge portions 26. This may move the embossments 22 out of desired relationship to the edges of deck lid 12 and cause difficulties in mounting the deck lid within the deck lid opening of the body. The bead 28 may aid shifting movement of the panels by acting as a lubricant.

In accordance with this invention, the edge portions 26 of the inner panel are each provided with a plurality of integral offset angular tabs or abutments which extend laterally of the terminus of a respective edge portion and are spaced longitudinally of such edge portion. Certain of the abutments 30 comprise one group and are located or spaced a predetermined distance from the terminus of a respective edge portion so as to provide a group of abutments which are laterally aligned with each other longitudinally of an edge portion of the panel. The number of such abutments in such group may be varied as desired, but, of course, at least two as a minimum should be provided. Other abutments 32 comprise a second group spaced or located a lesser distance than abutments 30 from the terminus of a respective edge portion 26. Still other abutments 34 comprise a third group spaced or located a distance less than that of abutments 30 or 32 from the terminus of a respective edge portion.

When a hem flange 24 of the outer panel is hem flanged over a respective edge portion of the inner panel, the free edge thereof is shown as engaging the group of abutments 32, while being spaced from the group of abutments 30 and overlying the group of abutments 34, which are moved wholly or partially into registry with the edge portion as shown in FIG. 3.

FIG. 2 shows the free edge of the hem flange engaging all of the abutments of one group. However, it will be understood that due to manufacturing tolerances, such free edge may engage abutments of more than one group.

Although adjacent abutments 30, 32 and 34 are shown in longitudinally offset relationship with respect to each other, it will be understood that they may be longitudinally aligned with each other laterally of the terminus of a respective edge portion or otherwise located in accordance with this invention.

Since opposite spaced edge portions of the panels cannot shift relative to each other, any shifting movement of the panels is blocked regardless of the curing of the bead 28. The number of groups of abutments and the number of abutments in each group may be varied as is necessary with the particular type of closure panel, such as a door, hood, or deck lid.

Thus, this invention provides an improved vehicle body closure panel.

What is claimed is:

1. A vehicle body closure panel comprising, in combination, an inner panel having spaced edge portions, an outer panel juxtaposed to the inner panel and having edge portions hem flanged over respective edge portions of the inner panel, and at least one abutment on each of the inner panel edge portions being engageable with the free edge of a respective outer panel hem flange to limit relative longitudinal shifting movement of the panels between the edge portions thereof.

2. A vehicle body closure panel comprising, in combination, an inner panel having spaced edge portions, each provided with a plurality of abutments spaced varying distances from the terminus thereof, and an outer panel juxtaposed to the inner panel and having spaced edge portions hem flanged over respective edge portions of the inner panel, the hem flanges being engageable with at least one abutment on a respective edge portion of the inner panel to limit relative shifting movement of the panels between the edge portions thereof.

3. A vehicle body closure panel comprising, in combination, an inner panel having spaced edge portions, each edge portion having a plurality of angularly extending integral abutments, each abutment spaced a different distance from the terminus of a respective edge portion, an outer panel juxtaposed to the inner panel and having edge portions hem flanged over a respective edge portion of the inner panel, the free edge of each hem flange being engageable with an integral abutment on a respective edge portion of the inner panel to limit relative shifting movement of the panels between the edge portions thereof.

4. A closure panel comprising, in combination, an inner panel having spaced edge portions, each provided with a plurality of groups of abutments, each group being spaced a different distance from the terminus of the edge portion of the inner panel than the other groups, an outer panel juxtaposed to the inner panel and having edge portions hem flanged over a respective edge portion of the inner panel, the terminus of each hem flange being engageable with at least one group of each edge portion to limit relative shifting movement of the panels between the edge portions thereof.

5. The combination recited in claim 4 wherein the abutments of the groups are longitudinally aligned laterally of a respective inner panel edge portion.

6. The combination recited in claim 4 wherein the abutments of one group are offset longitudinally of the abutments of the other groups.

7. The combination recited in claim 6 wherein the abutments of the groups are longitudinally aligned.

8. The combination recited in claim 4 wherein the abutments are angularly extending integral lanced tabs.

* * * * *